UNITED STATES PATENT OFFICE.

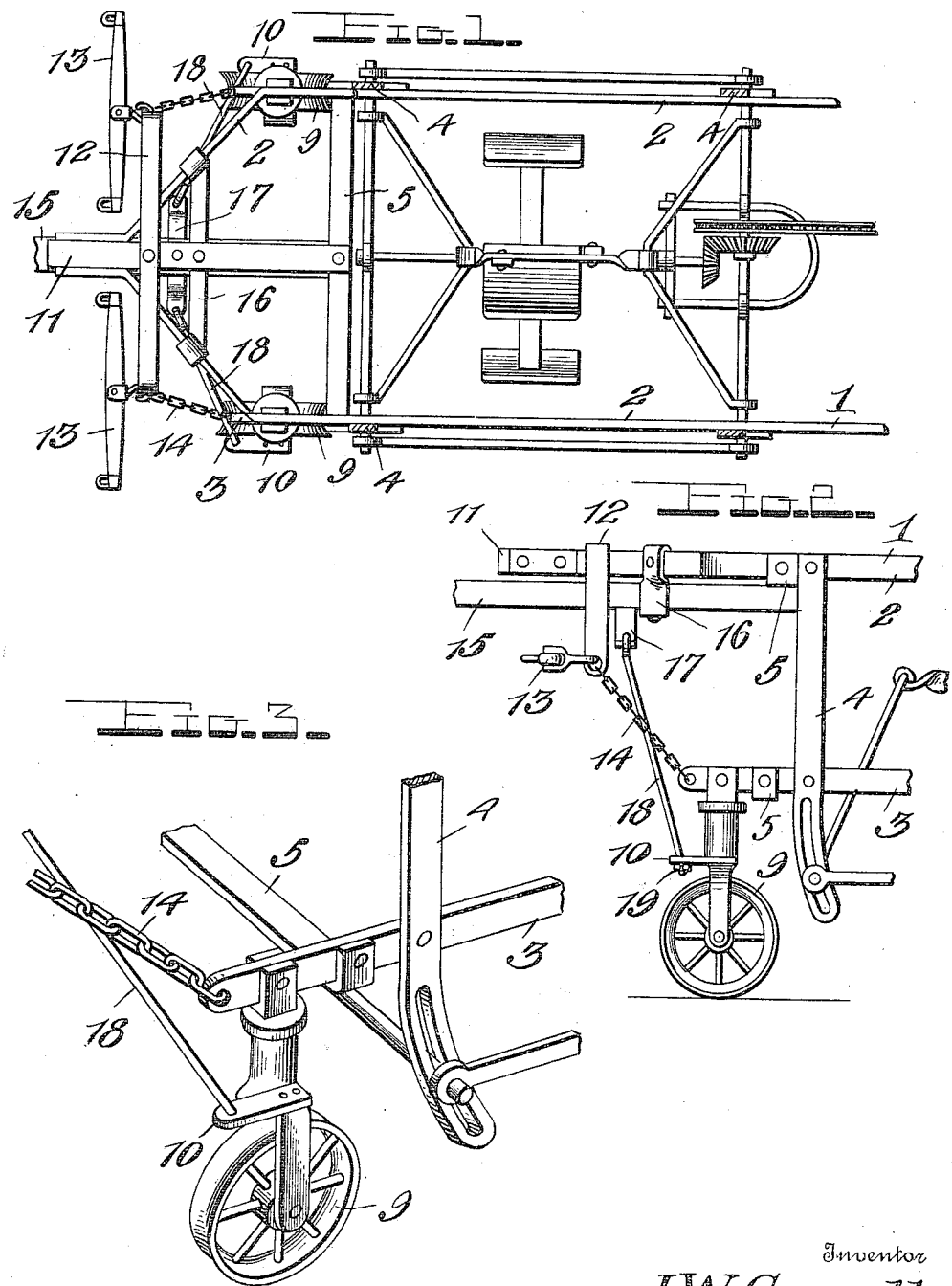

JAMES WILLIAM GARRETT, OF ELK CITY, OKLAHOMA.

COTTON-CHOPPER.

979,463.

Specification of Letters Patent. Patented Dec. 27, 1910.

Application filed December 29, 1909. Serial No. 535,415.

*To all whom it may concern:*

Be it known that I, JAMES W. GARRETT, a citizen of the United States, residing at Elk City, in the county of Beckham and State of Oklahoma, have invented certain new and useful Improvements in Cotton-Choppers, of which the following is a specification, reference being had to the accompanying drawings.

This invention relates to certain new and useful improvements in cotton choppers and has for its object to improve the construction and increase the efficiency of a machine of the above character for which Patent #913,373 was granted to me February 23, 1909.

A further object is to provide means whereby the machine may be easily turned by the draft team.

With these and other objects in view, the invention consists of the novel features of construction and the combination and arrangement of parts hereinafter fully described and claimed, and illustrated in the accompanying drawings, in which—

Figure 1 is a top plan view of a machine illustrating the application of my invention; Fig. 2 is a side elevation of the front end of the machine; and Fig. 3 is a detail perspective view of one of the casters and a portion of the supporting frame.

Referring to the drawings, 1 indicates the main frame consisting of the upper and lower parallel side bars 2 and 3 respectively. These side bars are united by the upright bars 4 and each pair of longitudinal side bars are connected and braced by the transverse cross bars 5. The rear end of the frame is supported by suitable traction wheels, not shown.

The forward ends of the lower pair of longitudinal bars 3 have secured thereto the casters 9 which may be of any approved construction. To each of these casters a laterally extending arm 10 is secured. A stub tongue 11 is rigidly secured to the forward transverse connecting bar of the upper longitudinal bars 2, and the side bars are extended beyond the forward uprights 4 and have their ends secured to the sides of the tongue. A U-shaped bar 12 is secured upon the tongue adjacent to its outer end and to the extremities of the vertical portions of this bar the swingletrees 13 are attached. This bar is also connected to each of the lower longitudinal bars by means of the chains 14. A second tongue 15 is arranged below the stationary tongue and is pivotally secured at its rear end beneath the transverse bar 5. This tongue is supported and guided by means of the yoke bar 16, the ends of which are rigidly secured to the inwardly extending end portions of the upper longitudinal frame bars 2.

Pivoted to the tongue 15 and depending therefrom there is a transversely disposed U-shaped plate 17, the ends of which are laterally extended and have secured thereto one end of the link rods 18. The other ends of these rods are disposed through apertures in the extremities of the arms 10 carried by the casters, and are retained therein by means of the nuts 19 which have threaded engagement upon the ends of said rods. Thus when it is desired to turn the machine, the draft animals will swing the pivoted tongue 15 and cause the casters 9 to turn whereby the direction of movement of the machine is guided without placing undue strain upon the animals or requiring that a very wide turn be made as the casters will permit of the machine being turned within its own length.

From the foregoing it will be seen that I have produced a cotton chopping machine which is of comparatively simple construction and which is so constructed that the utility and the efficiency of my previously patented machine are greatly increased, while at the same time the expense incident to the construction of such machines is materially reduced.

Having thus described the invention what is claimed is:

1. In a cotton chopper, a main frame comprising upper and lower pairs of longitudinal bars, a stub tongue rigidly secured between the forward ends of the upper bars, a transverse guide member secured to said bars, a pivoted tongue transversely movable on said guide member, a caster secured to the forward end of each of the lower longitudinal bars, and link rods connecting said casters to said pivoted tongue for simultaneous pivotal movement.

2. In a cotton chopper, a main frame comprising upper and lower longitudinal bars, transverse bars connecting the upper longitudinal bars, a draft tongue pivoted to one of said transverse bars, means for supporting said tongue, a caster secured to the forward end of each of the lower longitudinal bars, and a link rod connecting each of said casters to said pivoted tongue for simultaneous pivotal movement.

3. In a cotton chopper, a wheel supported frame, a forwardly extending stub tongue secured to said frame, a transverse guide carried by said frame, a pivoted draft tongue arranged beneath said stub tongue and movable in said guide, an inverted U-shaped bar transversely disposed and pivoted to the under side of said draft tongue, casters secured to the forward end of said wheel supported frame, a laterally extending arm secured to each of said casters, and link rods connecting the ends of said pivoted U-shaped bar to said arms.

In testimony whereof I hereunto affix my signature in the presence of two witnesses.

JAMES WILLIAM GARRETT.

Witnesses:
   G. E. MARTIN,
   O. P. McREE.